DISCHARGE AND FILLING APPARATUS FOR FLUIDIZED SOLID PARTICLES
Filed May 5, 1961
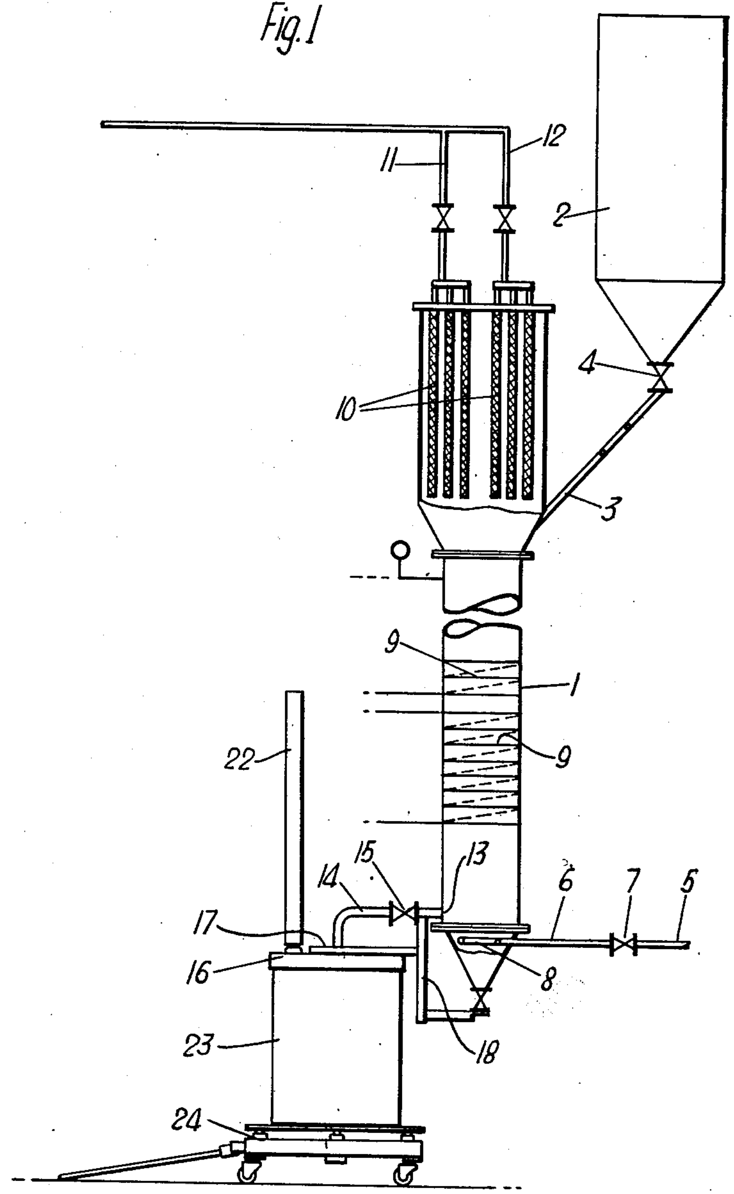
Inventor
Harry Lister Riley
By
Bailey, Stephens & Huettig
Attorneys

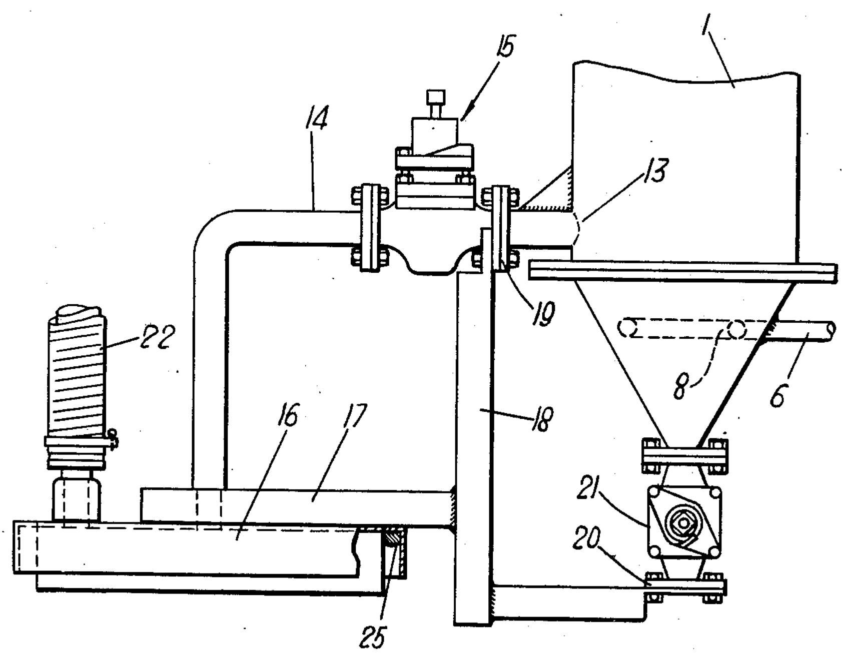
Inventor
Harry Lister Riley
By
Bailey, Stephens & Huettig
Attorneys 3,112,776

DISCHARGE AND FILLING APPARATUS FOR FLUIDIZED SOLID PARTICLES

Harry Lister Riley, Worksop, England, assignor to United Coke and Chemicals Company Limited Filed May 5, 1961, Ser. No. 103,091
Claims priority, application Great Britain May 9, 1960
1 Claim. (Cl. 141—67)

This invention relates to apparatus for carrying out processes involving fluidized solid particles.

In some such processes it is necessary to discharge the particles from the vessel containing them and to avoid the introduction of dust into the atmosphere while this is being done. This is particularly necessary when the particles are obnoxious to health. For example when particles of a fused mixture of vanadium pentoxide and potassium pyrosulphate are being absorbed by fluidized particles of silica gel or other porous carrier to form catalyst particles as described in our application Serial No. 79,971, filed January 3, 1961, it is important to empty the vessel at the end of the process without allowing dust to escape. Furthermore, if the catalyst can be emptied into a container whilst it is still at the temperature of absorption, which may be as high as 500° C., then no time will be lost in cooling the absorption vessel.

An object of this invention is the provision of improved apparatus for discharging fluidized particles.

The basis of my invention is that successive drums or other containers are filled by causing the particles while still fluidized to flow into them from the process vessel through a fixed cover beneath which each drum is brought in turn. The cover is adapted to make an air-tight seal on the open top of the drum or other container, and a filter is mounted on the cover in register with an opening through the cover. Fluidized particles of course flow in the same way as a liquid, and the discharge is effected while the particles are fluidized and still hot and with the drum or the like in position beneath the cover. The fluidizing gas, which is normally air, escapes to the atmosphere through the filter, and the particles are deposited in the container.

One apparatus according to the invention will now be described by way of example with reference to the accompanying drawings, in which:

FIGURE 1 shows the fluidizing plant diagrammatically and FIGURE 2 is a view of the discharge apparatus on a larger scale.

The plant shown includes a vertical cylindrical vessel 1 into which particles of a fused mixture of vanadium pentoxide and potassium pyrosulphate mixed with particles of silica gel are charged from a hopper 2 down a pipe 3 under the control of a valve 4.

Heated compressed air supplied through a pipe 5 flows through a pipe 6 to the base of the vessel 1 under the control of a valve 7 and emerges through a distributing ring 8. This air flows upwards through the vessel 1 to maintain the particles fluidized in the vessel. The temperature in the vessel is maintained between 350 and 400° C. by external heating elements 9. At the top of the vessel there are filters 10, through which the air passes to flow to a chimney through pipes 11 and 12.

At the base of the column there is an outlet 13 from which a pipe 14 containing a stop valve 15 extends to an opening in a cover 16, which is fixed to the end of the pipe 14. Two arms 17 welded to a compound bracket 18 extend across the top of the cover. The bracket 18 is bolted both to a flange 19 of the valve 15 and to a flange 20 of a valve 21 at the bottom of the vessel 1, this valve being normally closed but opened to allow discharge of any particles that may fall to the bottom of the vessel 1. The bracket 18 is thus rigidly mounted, and the arms 17 that are rigid with it are able to take an upward vertical thrust on the cover 16. This cover has a second opening over which a filter 22 which allows air to pass while retaining solid particles is mounted.

The purpose of the process is to cause the particles of silica gel to absorb the other particles. When the absorption is complete a drum 23 of size to fit the cover is brought on a lift truck 24 into position beneath the cover 16, and is jacked up to make a tight fit with the cover. To ensure a good seal the underside of the cover is provided with a packing 25 of a soft refractory material such as asbestos. Then the valve 15 is opened while the flow of air is maintained so that the catalyst is discharged in fluidized form through the pipe 14 and the cover 16 into the drum 23. The fluidizing air escapes to the atmosphere through the filter 22, and the particles are deposited in the drum 23.

I claim:

In an apparatus for carrying out processes involving fluidized particles, the combination of a vertical vessel, means for introducing gas into the base of said vessel to flow upwardly and fluidize particles therein, filtering means for removing dust from said fluidizing gas at the upper end of said vessel, a discharge outlet from said vessel above the point of introduction of said gas, a conduit extending from said outlet, a stop valve in said conduit, a cover in fixed relationship to said vessel and adapted to make an air-tight seal on the open top of a container for particles discharged from said vessel, said cover having two openings through it, a filter mounted on the cover in register with one of said openings through the cover, said conduit terminating in the second of said openings, and means below the cover to engage and jack up a container into sealing engagement with the cover, whereby while said stop valve is closed gas introduced into said vessel fluidizes particles in said vessel and is filtered and when said stop valve is opened the continued introduction of gas causes fluidized discharge of said particles into said container with entrapment of dust by the filter on the cover.

References Cited in the file of this patent

UNITED STATES PATENTS

| | | |
|---|---|---|
| 1,149,844 | Lieber | Aug. 10, 1915 |
| 1,311,955 | Edison | Aug. 5, 1919 |
| 2,706,589 | Bingham | Apr. 19, 1955 |